US012593139B2

(12) United States Patent (10) Patent No.: US 12,593,139 B2
Jang (45) Date of Patent: Mar. 31, 2026

(54) IMAGE SIGNAL PROCESSOR AND METHOD FOR PROCESSING IMAGE SIGNAL

(71) Applicant: SK hynix Inc., Icheon-si (KR)

(72) Inventor: Cheol Jon Jang, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 202 days.

(21) Appl. No.: 18/360,637

(22) Filed: Jul. 27, 2023

(65) Prior Publication Data

US 2024/0267635 A1 Aug. 8, 2024

(30) Foreign Application Priority Data

Feb. 2, 2023 (KR) ........................ 10-2023-0014232

(51) Int. Cl.
| | |
|---|---|
| *H04N 23/84* | (2023.01) |
| *G06T 3/4007* | (2024.01) |
| *H04N 23/81* | (2023.01) |
| *H04N 23/83* | (2023.01) |

(52) U.S. Cl.
CPC ......... *H04N 23/843* (2023.01); *G06T 3/4007* (2013.01); *H04N 23/81* (2023.01); *H04N 23/83* (2023.01)

(58) Field of Classification Search
None
See application file for complete search history.

(56) References Cited

U.S. PATENT DOCUMENTS

| | | | |
|---|---|---|---|
| 10,984,504 B2 | 4/2021 | Oh et al. | |
| 2008/0285889 A1* | 11/2008 | Shimizu | .................. G06T 3/403 382/300 |
| 2009/0066821 A1* | 3/2009 | Achong | ............... H04N 23/843 348/E5.091 |
| 2009/0167904 A1* | 7/2009 | Matsushima | .......... H04N 23/81 348/241 |
| 2013/0051665 A1* | 2/2013 | Shinozaki | ................. G06T 5/00 382/167 |
| 2014/0355872 A1* | 12/2014 | Shih | ......................... G06T 7/90 382/164 |
| 2025/0024159 A1* | 1/2025 | Jang | ........................ G06V 10/54 |
| 2025/0056135 A1* | 2/2025 | Jang | ........................ G06T 3/403 |

FOREIGN PATENT DOCUMENTS

| | | |
|---|---|---|
| KR | 101327790 B1 | 11/2013 |
| KR | 1020220080197 A | 6/2022 |

\* cited by examiner

*Primary Examiner* — Twyler L Haskins
*Assistant Examiner* — Wesley J Chiu
(74) *Attorney, Agent, or Firm* — WILLIAM PARK AND ASSOCIATES LTD.

(57) ABSTRACT

An image signal processor, and a method for processing an image signal, include a directionality strength determiner, a half-directional pattern determiner, and a pixel interpolator. The directionality strength determiner divides a target kernel including a target pixel into a plurality of sub-kernels, and generates gradient sum information by calculating direction-ality strength of each of the plurality of sub-kernels. The half-directional pattern determiner determines whether a half-directional edge pattern is included in each of the sub-kernels in response to the gradient sum information. The pixel interpolator interpolates the target pixel in response to the edge pattern determined by the half-directional pattern determiner.

18 Claims, 11 Drawing Sheets

IMAGE SIGNAL PROCESSOR AND METHOD FOR PROCESSING IMAGE SIGNAL

CROSS-REFERENCE TO RELATED APPLICATION

This patent application claims priority under 35 U.S.C. § 119(a) to Korean patent application No. 10-2023-0014232, filed on Feb. 2, 2023, in the Korean Intellectual Property Office, which is hereby incorporated by reference in its entirety as part of the disclosure of this patent document.

TECHNICAL FIELD

The technology and implementations disclosed in this patent document generally relate to an image signal processor capable of performing image processing and a method for processing an image signal.

BACKGROUND

An image sensing device is a device for capturing optical images by converting light into electrical signals using a photosensitive semiconductor material which reacts to light. With the development of automotive, medical, computer, and communication industries, the demand for high-performance image sensing devices is increasing in various devices such as smart phones, digital cameras, game machines, IoT (Internet of Things), robots, security cameras, and medical micro cameras.

A pixel array that directly captures an optical image in an image sensing device may include defective pixels that cannot normally acquire a color image due to process reasons. To implement an autofocus function, phase difference detection pixel(s) may be included in the pixel array. The phase difference detection pixels capable of acquiring phase-difference related information cannot acquire color images like defective pixels, such that the phase difference detection pixel can be treated as defective pixels from the point of view of color images.

As a process for the pixel array is advanced and the autofocus function becomes more important, the ratio of defective pixels or phase difference detection pixels included in the pixel array is increasing, and the accuracy of correction for the defective pixels or the phase difference detection pixels is being highlighted as an important factor in determining the quality of images.

SUMMARY

Various embodiments of the disclosed technology relate to an image signal processor capable of increasing the accuracy of correction of defective pixels or the like, and an image signal processing method for the same.

In accordance with an embodiment of the disclosed technology, an image signal processor may include: a directionality strength determiner configured to divide a target kernel including a target pixel into a plurality of sub-kernels, and generate gradient sum information by calculating directionality strength of each of the plurality of sub-kernels; a half-directional pattern determiner configured to determine whether a half-directional edge pattern is included in each of the sub-kernels in response to the gradient sum information; and a pixel interpolator configured to interpolate the target pixel in response to the edge pattern determined by the half-directional pattern determiner.

In accordance with another embodiment of the disclosed technology, a method for processing an image signal may include: converting pixels included in a target kernel having a target pixel into pixels having the same color by converting a gain of a color pixel; dividing the target kernel into a plurality of sub-kernels; calculating a gradient sum in a direction corresponding to positions of the plurality of sub-kernels; determining a half direction using the gradient sum; compensating for a full edge pattern when a result of determination of the half direction is not the half direction, and determining a type of an edge pattern when a result of determination of the half direction is the half direction; and compensating for an edge pattern in response to the type of the edge pattern.

It is to be understood that both the foregoing general description and the following detailed description of the disclosed technology are illustrative and explanatory and are intended to provide further explanation of the disclosure as claimed.

BRIEF DESCRIPTION OF THE DRAWINGS

The above and other features and beneficial aspects of the disclosed technology will become readily apparent with reference to the following detailed description when considered in conjunction with the accompanying drawings.

DETAILED DESCRIPTION

Figure 1:
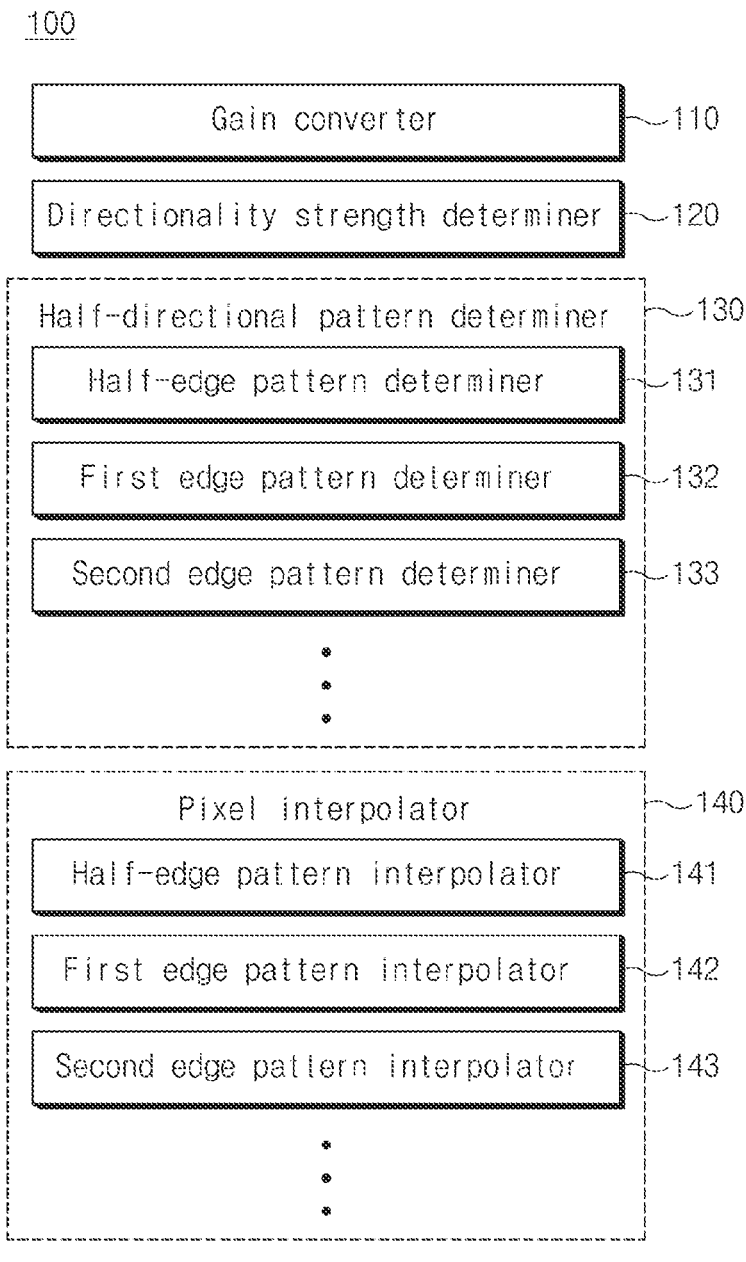
FIG. 1 is a block diagram illustrating an example of an image signal processor based on some implementations of the disclosed technology.

This patent document provides implementations and examples of an image signal processor and a method for processing an image signal that may be used in configurations to substantially address one or more technical or engineering issues and to mitigate limitations or disadvantages encountered in some other image signal processors. Some implementations of the disclosed technology relate to an image signal processor capable of increasing the accuracy of correction of defective pixels or the like, and an image signal processing method for the same. In recognition of the issues above, the disclosed technology can detect and correct a texture considering an edge corner at the position of a phase difference detection pixel during a binning mode of pixel(s), and can thus prevent correction errors of phase difference detection pixels that may be seen as a regular pattern in a high frequency region.

Reference will now be made in detail to the embodiments of the disclosed technology, examples of which are illustrated in the accompanying drawings. Wherever possible, the same reference numbers will be used throughout the drawings to refer to the same or like parts. While the disclosure is susceptible to various modifications and alternative forms, specific embodiments thereof are shown by way of example in the drawings. However, the disclosure should not be construed as being limited to the embodiments set forth herein.

Hereafter, various embodiments will be described with reference to the accompanying drawings. However, it should be understood that the disclosed technology is not limited to specific embodiments, but includes various modifications, equivalents and/or alternatives of the embodiments. The embodiments of the disclosed technology may provide a variety of effects capable of being directly or indirectly recognized through the disclosed technology.

A pixel array of an image sensing device may include defective pixels which are unable to normally capture a color image due to fabrication limitations or temporary noise inflow. Also, the pixel array may include phase difference detection pixels for obtaining phase-difference related information to implement an autofocus function. Because the phase difference detection pixel is unable to obtain a color image like a defective pixel, the phase difference detection pixel can be treated as a defective pixel from the point of view of a color image. In the embodiments of the disclosed technology, defective pixels incapable of normally obtaining the color image and a phase difference detection pixel will hereinafter be collectively referred to as "defective pixels".

To increase the quality of a color image, it is essential to increase the accuracy of correcting defective pixels. To this end, the image signal processor, based on some implementations of the disclosed technology, may detect one or more defective pixels and may correct the detected defective pixels.

FIG. 1 is a block diagram illustrating an example of an image signal processor 100 based on some implementations of the disclosed technology.

Referring to FIG. 1, the image signal processor 100 according to an embodiment of the disclosed technology may include a gain converter 110, a directionality strength determiner 120, a half-directional pattern determiner 130, and a pixel interpolator 140.

The gain converter 110 may convert pixels included in a target kernel including a target pixel into pixels having the same color by converting a gain of pixels included in a Bayer pattern. Here, the kernel may refer to a unit for processing image signals.

Further, the directionality strength determiner 120 may divide the target kernel into a plurality of sub-kernels, may calculate the directionality strength of each sub-kernel, and may thus determine the presence or absence of a direction having strong directionality based on the calculated directionality strength. In some implementations of the disclosed technology, the directionality strength may correspond to a sum of gradients (hereinafter referred to as a gradient sum), and may be a value that is obtained by summing differences between pixel data values of pixels arranged in a specific direction within a target kernel.

The half-directional pattern determiner 130 may determine whether a half-directional texture pattern is included in each sub-kernel in response to an output signal of the directionality strength determiner 120. The half-directional pattern determiner 130 may include a half-edge pattern determiner 131, a first edge pattern determiner 132, and a second edge pattern determiner 133.

The half-edge pattern determiner 131 may determine a half-edge pattern corresponding to a kernel including a target pixel in response to gradient sum information received from the directionality strength determiner 120. The first edge pattern determiner 132 may determine a first edge pattern corresponding to a kernel including a target pixel in response to gradient sum information received from the directionality strength determiner 120. The second edge pattern determiner 133 may determine a second edge pattern corresponding to a kernel including a target pixel in response to gradient sum information received from the directionality strength determiner 120.

As described above, the half-directional pattern determiner 130 may detect various edge patterns in which pixels have directionality in the target kernel in response to the gradient sum information received from the directionality strength determiner 120, but some pixels belonging to the same texture as the target pixel in the same manner as full edge pattern are not all disposed at one side of an edge formed in a straight line shape. The operation of the half-directional pattern determiner 130 will be described later with reference to FIGS. 5 and 6.

The pixel interpolator 140 may correct pixel data of a target pixel based on image data of a kernel including the target pixel. The pixel interpolator 140 may interpolate a target pixel using pixel data of pixels determined by the half-directional pattern determiner 130. In some implementations, the pixel interpolator 140 may interpolate the target pixel through different compensation methods corresponding to patterns detected by the half-edge pattern determiner 131, the first edge pattern determiner 132, and the second edge pattern determiner 133. A more detailed operation of the pixel interpolator 140 will be given later with reference to FIGS. 7 and 8.

Figure 2A:
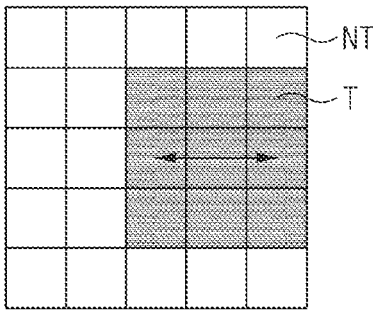
FIGS. 2A to 2C are schematic diagrams illustrating examples of half-directional patterns based on some implementations of the disclosed technology.
Figure 2B:
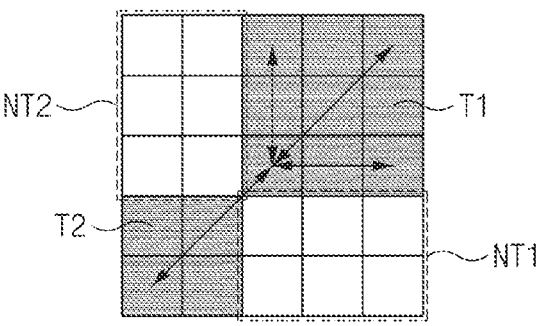
Figure 2C:
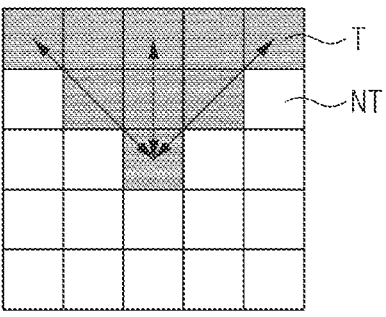

FIGS. 2A to 2C are schematic diagrams illustrating examples of half-directional patterns based on some implementations of the disclosed technology.

A method for determining basic in-kernel directionality may determine whether a texture exists in horizontal, vertical, and diagonal directions with respect to the entire target kernel. However, it is impossible for such directionality determination to provide accurate information in a high-frequency region rather than a straight pattern. Particularly, such directionality determination cannot provide accurate information in a bent or discontinuous texture pattern within a kernel, for example, in any of an edge texture that is cut in the middle, a checkered texture pattern, a boundary of lattice textures, and a boundary of diamond-shaped textures. For example, if directionality determination is performed for a kernel formed with "¬"-shaped edges, it is easy for such directionality to correspond to a backslash direction. Thus, if there is a phase difference detection pixel at a bent position of the texture, the result of correcting the phase difference detection pixel can easily remove the bent texture. As a result, the embodiment of the disclosed technology can determine the directionality using the half direction in the kernel.

FIG. 2A is a schematic diagram illustrating an example of a half-edge pattern having a bent or broken (discontinuous) texture.

Image data corresponding to one frame may include textures of various sizes and shapes. The texture may refer to a set of pixels having similarity. For example, a subject having a unified color included in a captured scene may be recognized as a texture. The boundary of the texture may be defined as an edge, and pixel data may vary greatly at the inside of the edge (i.e., inside of the texture) or at the outside of the edge (i.e., outside of the texture).

Typically, when a portion of the edge is included in a kernel, the edge may be formed in a straight line shape crossing the kernel so that pixels included in the kernel may be divided into two types of pixels with respect to the edge. As such, a pattern in which pixels included in the kernel are divided into two types of pixels with respect to the edge may be defined as a full edge pattern. In this case, when the target pixel of the kernel is a defective pixel, the image signal processor may correct the target pixel based on pixel data of adjacent pixels disposed at one side of the kernel with respect to the edge.

Thus, if there is a phase difference detection pixel at a bent position of to the edge while having directionality in a similar way to the full edge pattern. The half-edge pattern may be a pattern located at the end of the texture. In addition, the half-edge pattern may refer to a pattern in which a region of one side based on the edge is filled with a texture region (T) and a non-texture region (NT), rather than a pattern in which a region of one side based on the edge crossing the kernel is filled with a region (i.e., a texture region) corresponding to the texture and a region of the other side based on the edge is filled with a non-texture region.

FIG. 2B is a schematic diagram illustrating an example of a second edge pattern having a bent or broken (discontinuous) texture.

FIG. 2B is a schematic diagram illustrating an edge pattern having horizontal directionality, vertical directionality, and slash directionalities. As shown in FIG. 2B, a pattern in which pixels included in the kernel are located at one end (one corner) or both ends (both corners) of the texture will be defined as a "second edge pattern (checkered pattern)". The second edge pattern may have a shape in which texture regions (T1, T2) facing each other in a diagonal direction with respect to edges perpendicular to each other within the target kernel have the same pattern. In other words, the second edge pattern may have a shape in which diagonal end regions (for example, a right-upper corner region or a left-lower corner region) of both sides in regions divided by straight lines perpendicular to each other are filled with texture regions (T1, T2) and diagonal end regions (for example, a left-upper corner region or a right-lower corner region) of the other both sides in regions divided by straight lines perpendicular to each other are filled with non-texture regions (NT1,NT2). The second edge pattern may have the same pattern (e.g., a checkered pattern) between the texture regions (T1, T2) located at both corners, but the texture sizes may be different from each other.

FIG. 2C is a schematic diagram illustrating an example of a first edge pattern having a bent or broken (discontinuous) texture.

FIG. 2C is a schematic diagram illustrating an edge pattern having vertical directionality, slash (positive slope) directionality, and backslash (negative slope) directionality. As shown in FIG. 2C, a pattern in which pixels included in the kernel are located at one end (e.g., an upper end region) of the texture will be defined as a "first edge pattern (diamond pattern)". As another example, the pattern may also be defined as various patterns such as a stair pattern. The first edge pattern may refer to a texture in which a texture pattern disposed in the kernel has two diagonal directions with respect to the edge. That is, the first edge pattern may refer to a shape in which edges are distinguished from other regions in two diagonal directions, so that the first edge pattern may be filled with texture regions (T) and non-texture regions (NT).

Because a bent or broken texture exists only in some regions of the target kernel, directionality of each of the edge patterns shown in FIGS. 2A to 2C can be determined using a relatively shorter length than the full edge pattern. Here, determining the direction (directionality) in the half-edge pattern may be defined as a half direction.

If directionalities of the edge patterns shown in FIGS. 2A to 2C are determined by a general edge determination method, it may be impossible to accurately determine the directionalities of the edge patterns shown in FIGS. 2A to 2C. This is because the half-edge patterns do not have a shape in which the half-edge patterns are arranged at one side with respect to a specific edge formed in a straight line shape. Accordingly, the embodiment of the disclosed technology can accurately determine the directionality corresponding to the shape of the edge pattern.

Figure 3:
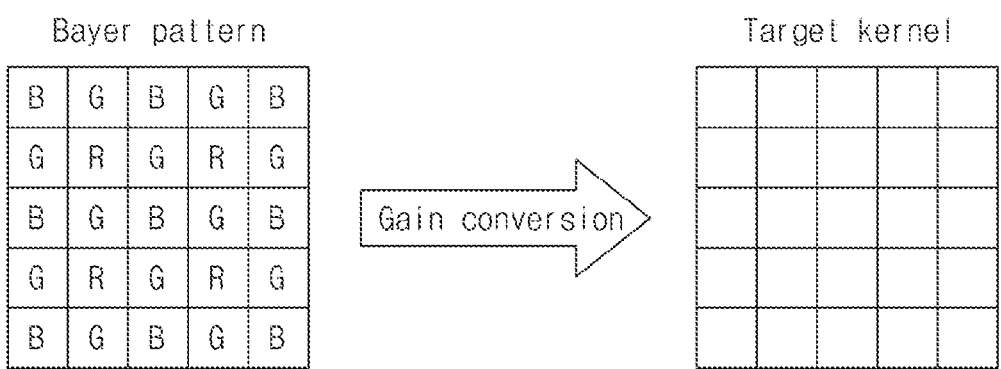
FIG. 3 is a schematic diagram illustrating an example of a gain converter shown in FIG. 1 based on some implementations of the disclosed technology.

FIG. 3 is a schematic diagram illustrating an example of the gain converter 110 shown in FIG. 1 based on some implementations of the disclosed technology.

In this embodiment of the disclosed technology, a method for correcting a defective pixel using a Bayer pattern as an example will hereinafter be described in detail. For example, the Bayer pattern may be a (5×5) kernel that includes blue pixels (B), red pixels (R), and green pixels (G), and a target pixel from among the (5×5) kernel may be the blue pixel (B). The red pixel (R) may generate red pixel data by detecting red light, the green pixel (G) may generate green pixel data by detecting green light, and the blue pixel (B) may generate blue pixel data by detecting blue light.

According to the embodiment of the disclosed technology, a kernel arranged in the Bayer pattern is described as an example, but the technical idea of the disclosed technology can also be applied to another kernel in which color pixels are arranged in other patterns such as a quad-Bayer pattern, a nona-Bayer pattern, a hexa-Bayer pattern, an RGBW pattern, a mono pattern, and the like. In addition, a kernel having another size other than the (5×5) size may be used depending on performance of the image signal processor, required correction accuracy, an arrangement method of color pixels, and the like.

When the method of determining the direction of a texture using the half-directional patterns shown in FIGS. 2A to 2C is used in the Bayer pattern, pixel information of homogeneous colors may be insufficient. Accordingly, the gain converter 110 may convert the gain of the Bayer pattern into a domain having the same color.

However, if a difference between a global white balance gain received from the outside and a white balance gain calculated in a local region is large, the ratio between colors may become inaccurate. In this case, conversion to the same domain may cause incorrect direction information, which may cause errors in directionality determination. Accordingly, according to the embodiment of the disclosed technology, the gain converter 110 may perform domain conversion only when the global white balance gain and the local white balance gain are similar to each other within the same or specific threshold value.

The gain converter 110 may generate a target kernel having the same green pixel (G) by multiplying each of the red pixel (R) and the blue pixel (B) by a gain value within the Bayer pattern.

The reason why the target kernel is created based on the green pixels (G) is that the target kernel is arranged in the Bayer pattern, the green pixels are relatively most often distributed and can be evenly distributed in the target kernel, and the green color includes more edge information of the image than the red or blue color.

Figure 4:
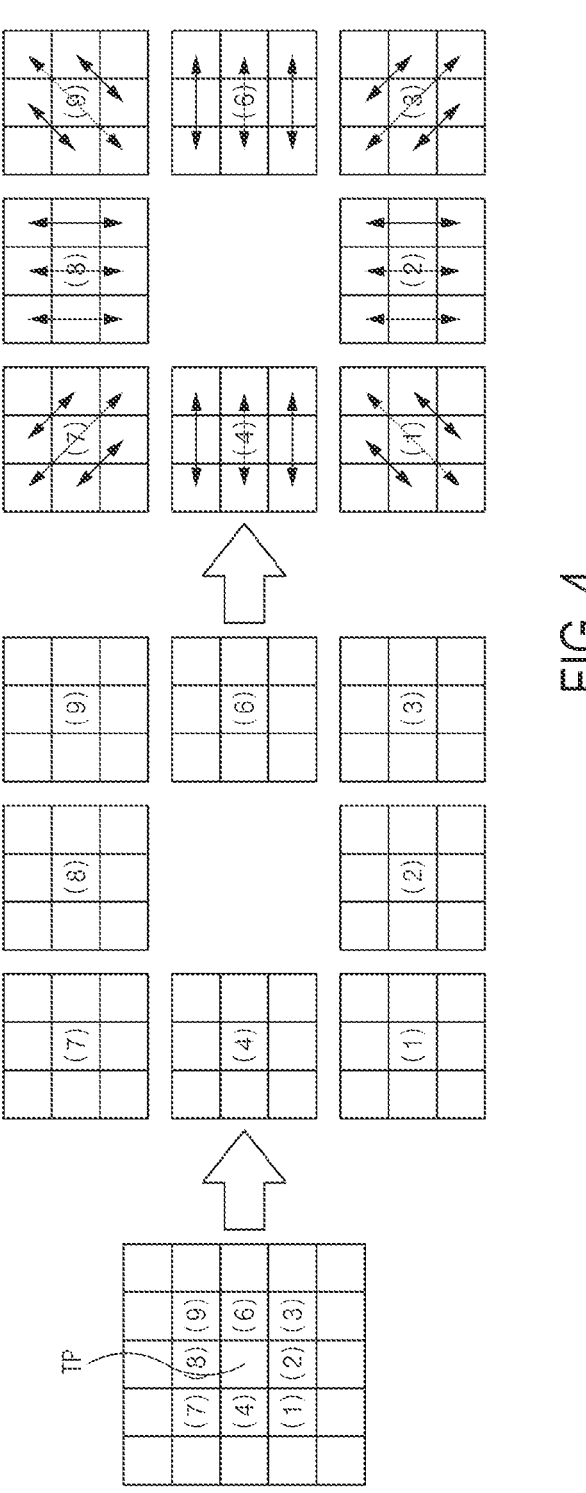
FIG. 4 is a schematic diagram illustrating a directionality strength determiner shown in FIG. 1 based on some implementations of the disclosed technology.

FIG. 4 is a schematic diagram illustrating the directionality strength determiner 120 shown in FIG. 1 based on some implementations of the disclosed technology.

Referring to FIG. 4, the directionality strength determiner 120 may divide the target kernel shown in FIG. 3 into a plurality of sub-kernels, and may obtain the sum of gradients (i.e., a gradient sum) in each sub-kernel.

In the embodiment of the disclosed technology, it is assumed that a defective pixel detection and correction operation is performed in units of a (5×5) kernel having 5 rows and 5 columns. A pixel located at the center of the (5×5) kernel may correspond to the target pixel (TP). The directionality strength determiner 120 may divide the (5×5) kernel into eight (3×3) sub-kernels, and may calculate the gradient sum in a direction corresponding to each position of each (3×3) kernel. The directionality strength determiner 120 may determine that, as the value of the gradient sum decreases, a target texture is more likely to be a texture arranged in the corresponding direction.

For example, as can be seen from FIG. 4, the (3×3) sub-kernels may be respectively disposed at the eight positions corresponding to eight numerals (1), (2), (3), (4), (6), (7), (8), and (9) in the target kernel, without being disposed at the position of the target pixel (TP). Further, the directionality strength determiner 120 may obtain a gradient sum in directions (e.g., four directions composed of a vertical direction, a horizontal direction, a slash direction, and a backslash direction) corresponding to the respective positions of the eight (3×3) sub-kernels.

That is, the gradient sum corresponding to the slash direction may be calculated in each of the sub-kernels centered on pixels (1) and (9) included in the target kernel. In other words, a gradient sum of the slash direction may be calculated by summing differences between pixel data values of pixels arranged in the slash direction. In each of the sub-kernels centered on the pixels (2) and (8) included in the target kernel, a gradient sum corresponding to the vertical direction can be calculated. In other words, a gradient sum of the vertical direction may be calculated by summing differences between pixel data values of pixels arranged in the vertical direction. In each of the sub-kernels centered on pixels (3) and (7) included in the target kernel, a gradient sum corresponding to the backslash direction may be calculated. In other words, the sum of gradients (i.e., a gradient sum) in the backslash direction may be calculated by summing differences between pixel data values of pixels arranged in the backslash direction. The gradient sum corresponding to the horizontal direction may be calculated in each of the sub-kernels centered on pixels (4) and (6) included in the target kernel. In other words, a gradient sum of the horizontal direction may be calculated by summing differences between pixel data values of pixels arranged in the horizontal direction.

The gradient sum in each of the above-described four directions (i.e., the vertical direction, the horizontal direction, the slash direction, and the backslash direction) may represent the directionality strength for each direction. The directionality strength determiner 120 may compare the directionality strengths of the four directions with each other, and may thus determine the presence or absence of the direction having strong directionality based on the result of comparison in directionality strength.

Specifically, when the directionality strength for a specific direction having the strongest directionality strength from among the directionality strengths for the above four directions is higher than the directionality strength for each of the remaining directions by a threshold strength or greater, the directionality strength determiner 120 may determine the specific direction to be a direction having strong directionality. Conversely, when the directionality strength of a specific direction having the strongest directionality from among the directionality strengths for the above four directions is not higher than the directionality strength for each of the remaining directions by a threshold strength or greater, the directionality strength determiner 120 may determine the absence of a direction having strong directionality.

Although the embodiment of the disclosed technology has exemplarily disclosed a method for calculating the gradient sum by dividing the (5×5) kernel into eight (3×3) sub-kernels for convenience of description, the scope or spirit of the disclosed technology is not limited thereto, and the unit of the target kernel and the unit of sub-kernels can be sufficiently changed.

In addition, according to the embodiment of the disclosed technology, it is assumed that the edge patterns of the (5×5) kernel have any one of eight directions for convenience of description, the scope or spirit of the disclosed technology is not limited thereto, and it should be noted that edge patterns of more subdivided directions may exist in a kernel larger than the (5×5) kernel. The method for correcting defective pixels according to the embodiment of the disclosed technology can also be equally applied to the edge patterns of the subdivided directions as needed.

Figure 5:
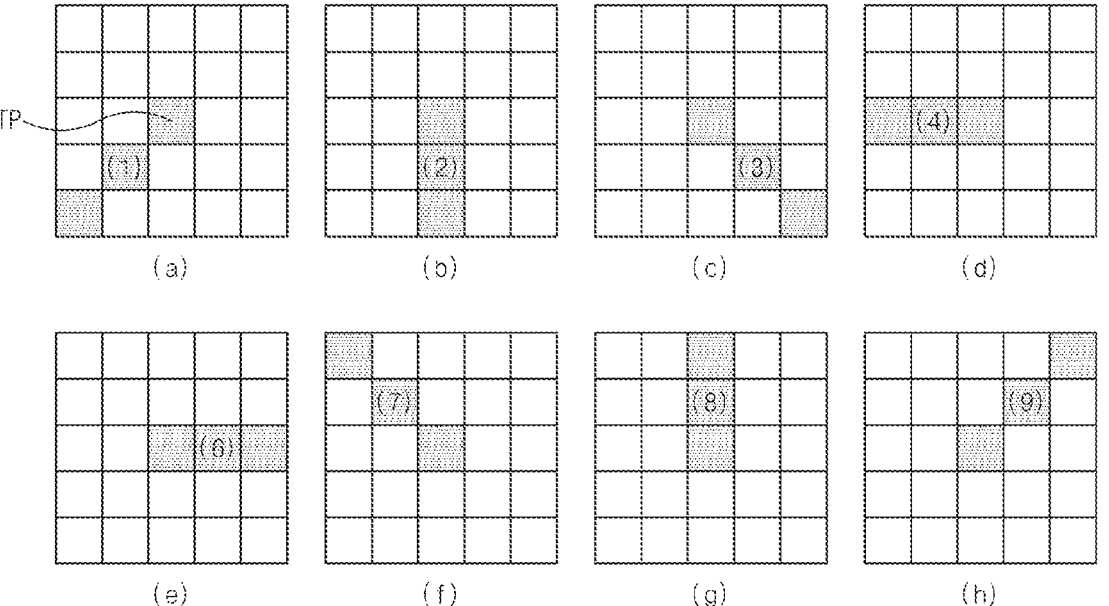
FIGS. 5 and 6 are schematic diagrams illustrating examples of a half-directional pattern determiner shown in FIG. 1 based on some implementations of the disclosed technology.
Figure 6:
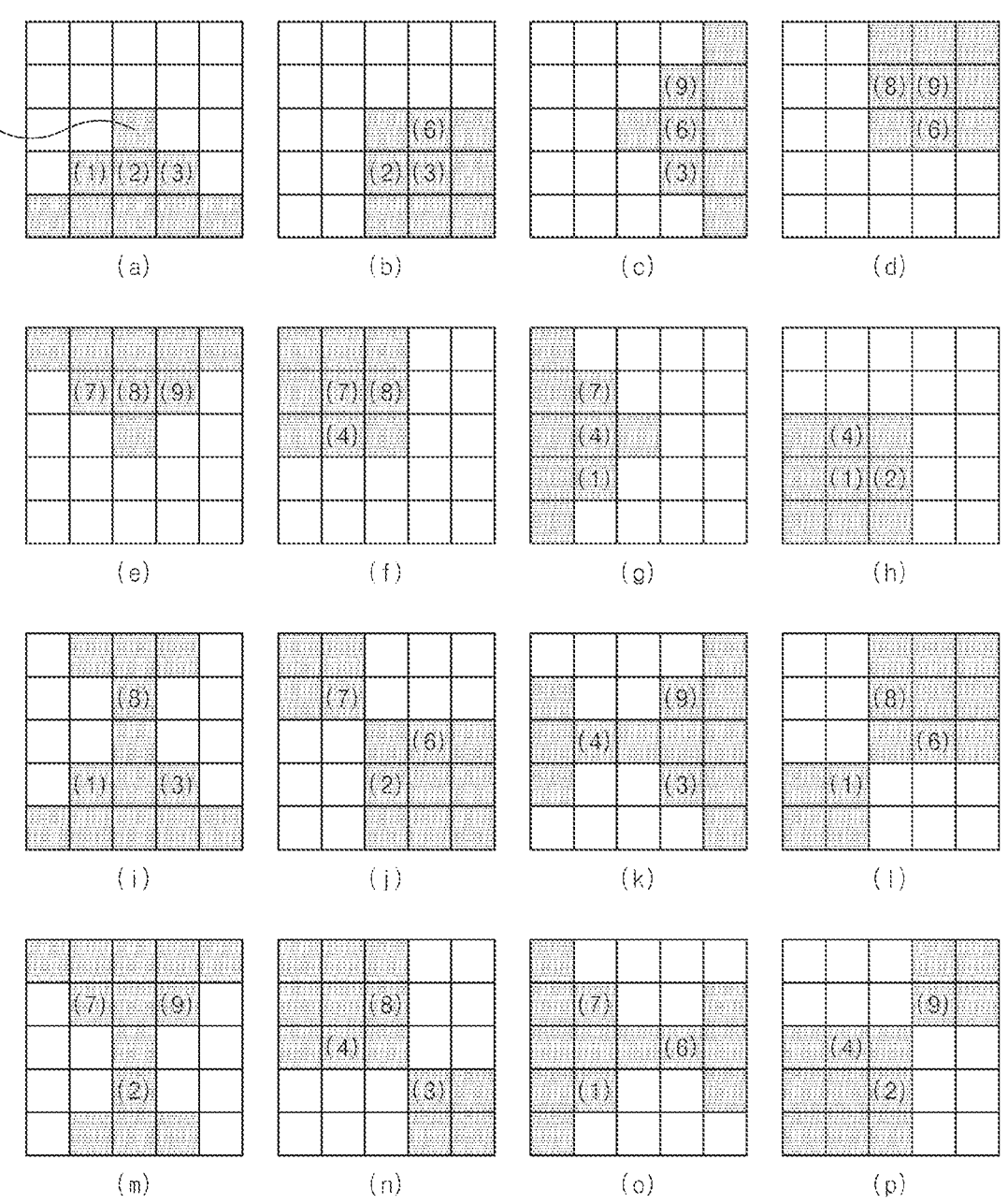

FIGS. 5 and 6 are schematic diagrams illustrating examples of the half-directional pattern determiner shown in FIG. 1 based on some implementations of the disclosed technology.

Referring to FIGS. 5 and 6, the half-directional pattern determiner 130 may detect a half-directional edge pattern using gradient sum information obtained from eight sub-kernels. Pixels shaded in FIGS. 5 and 6 may be pixels having pixel data similar to those of the target pixel, and may refer to pixels constituting an edge pattern included in the same texture as the target pixel. Here, the pixel data of the target pixel may refer to normal color pixel data that can be obtained when the target pixel is not a defective pixel.

Referring to FIG. 5, examples of half-edge patterns having directionality are illustrated in FIGS. 5(a) to 5(h). As can be seen from FIGS. 5(a) to 5(h), various half-edge patterns are illustrated, each of which includes a target pixel (TP) and pixels arranged in various directions from the target pixel (TP).

FIG. 5(a) illustrates an example of half-edge patterns having directionality in a left-lower direction from the target pixel (TP). FIG. 5(b) illustrates an example of half-edge patterns having directionality in a lower direction from the target pixel (TP). FIG. 5(c) illustrates an example of half-edge patterns having directionality in a right-lower direction from the target pixel (TP). FIG. 5(d) illustrates an example of half-edge patterns having directionality in a left direction from the target pixel (TP). FIG. 5(e) illustrates an example of half-edge patterns having directionality in a right direction from the target pixel (TP). FIG. 5(f) illustrates an example of half-edge patterns having directionality in a left-upper direction from the target pixel (TP). FIG. 5(g) illustrates an example of half-edge patterns having directionality in an upper direction from the target pixel (TP). FIG. 5(h) illustrates an example of half-edge patterns having directionality in a right-upper direction from the target pixel (TP). The half-edge patterns illustrated in FIGS. 5(a) to 5(h) are disclosed only for illustrative purposes, the scope or spirit of the disclosed technology is not limited thereto, and it should be noted that there may be various half-edge patterns in which pixels belonging to the same texture as the target pixel in the same manner as in the full edge pattern are not all disposed at one side of the straight edge.

As can be seen from FIGS. 5(*a*) to 5(*h*), the half-edge pattern determiner 131 may determine whether the half-edge pattern is included in the target kernel in response to the sum of gradients of sub-pixels. That is, the half-edge pattern determiner 131 may determine that the half-edge pattern is included in the target kernel when the first smallest gradient sum from among the eight gradient sums detected by the directionality strength determiner 120 is smaller than the remaining gradient sums by a predetermined threshold or greater.

Meanwhile, referring to FIG. 6, other examples of the edge patterns having directionalities are illustrated in FIGS. 6(*a*) to 6(*p*). As can be seen from FIGS. 6(*a*) to 6(*p*), various edge patterns are illustrated, each of which includes a target pixel (TP) and pixels arranged in various directions from the target pixel (TP).

FIG. 6(*a*) illustrates an example of edge patterns having directionality in a lower-end direction from the target pixel (TP). FIG. 6(*b*) illustrates an example of edge patterns having directionality in a right-lower corner direction from the target pixel (TP). FIG. 6(*c*) illustrates an example of edge patterns having directionality in a right-end direction from the target pixel (TP). FIG. 6(*d*) illustrates an example of edge patterns having directionality in a right-upper corner direction from the target pixel (TP). FIG. 6(*e*) illustrates an example of edge patterns having directionality in an upper-end direction from the target pixel (TP). FIG. 6(*f*) illustrates an example of edge patterns having directionality in a left-upper corner direction from the target pixel (TP). FIG. 6(*g*) illustrates an example of edge patterns having directionality in a left-end direction from the target pixel (TP). FIG. 6(*h*) illustrates an example of edge patterns having directionality in a left-lower direction from the target pixel (TP). The edge patterns illustrated in FIGS. 6(*a*) to 6(*h*) are disclosed only for illustrative purposes, the scope or spirit of the disclosed technology is not limited thereto, and it should be noted that there may be various edge patterns in which pixels belonging to the same texture as the target pixel in the same manner as in the full edge pattern are not all disposed at one side of the straight edge.

As can be seen from FIGS. 6(*a*) to 6(*h*), the first edge pattern determiner 132 may determine whether a first edge pattern is included in the target kernel in response to the sum of gradients of sub-kernels. That is, the first edge pattern determiner 132 may determine that the first edge pattern is included in the target kernel when the first smallest gradient sum, the second smallest gradient sum, the third smallest gradient sum from among the eight gradient sums detected by the directionality strength determiner 120 are consecutively adjacent in position to each other.

For example, FIGS. 6(*a*) to 6(*h*) illustrate examples in which the gradient sums are consecutively adjacent in position to each other. That is, as can be seen from FIG. 6(*a*), the pixels (1), (2), and (3) may be consecutively adjacent in position to each other in a horizontal direction. As can be seen from FIG. 6(*b*), the pixels (2), (3), and (6) may be consecutively adjacent in position to each other in the "⌐"-shaped direction. As can be seen from FIG. 6(*c*), the pixels (3), (6), and (9) may be consecutively adjacent in position to each other in a vertical direction. As can be seen from FIG. 6(*d*), the pixels (6), (9), and (8) may be consecutively adjacent in position to each other in the "⌐"-shaped direction. As can be seen from FIG. 6(*e*), the pixels (7), (8), and (9) may be consecutively adjacent in position to each other in the horizontal direction. As can be seen from FIG. 6(*f*), the pixels (4), (7), and (8) may be consecutively adjacent in position to each other in the "⌐"-shaped direction. As can be seen from FIG. 6(*g*), the pixels (1), (4), and (7) may be consecutively adjacent in position to each other in the vertical direction. As can be seen from FIG. 6(*h*), the pixels (2), (1), and (4) may be consecutively adjacent in position to each other in the "⌐"-shaped direction.

FIG. 6(*i*) illustrates an example of edge patterns having directionality in an upper-lower end direction from the target pixel (TP). FIG. 6(*j*) illustrates an example of edge patterns having directionality in a left-upper corner and right-lower corner direction from the target pixel (TP). FIG. 6(*k*) illustrates an example of edge patterns having directionality in a left-right end direction from the target pixel (TP). FIG. 6(*l*) illustrates an example of edge patterns having directionality in a left-lower corner and right-upper corner direction from the target pixel (TP). FIG. 6(*m*) illustrates an example of edge patterns having directionality in an upper-lower end direction from the target pixel (TP). FIG. 6(*n*) illustrates an example of edge patterns having directionality in a left-upper corner and right-lower corner direction from the target pixel (TP). FIG. 6(*o*) illustrates an example of edge patterns having directionality in a left-right end direction from the target pixel (TP). FIG. 6(*p*) illustrates an example of edge patterns having directionality in a left-lower corner and right-upper corner direction from the target pixel (TP). The edge patterns illustrated in FIGS. 6(*a*) to 6(*p*) are disclosed only for illustrative purposes, the scope or spirit of the disclosed technology is not limited thereto, and it should be noted that there may be various half-edge patterns in which pixels belonging to the same texture as the target pixel in the same manner as in the full edge pattern are not all disposed at one side of the straight edge.

As can be seen from FIGS. 6(*i*) to 6(*p*), the second edge pattern determiner 133 may determine whether the second edge pattern is included in the target kernel in response to the sum of gradients of sub-kernels. That is, when the first smallest gradient sum, the second smallest gradient sum, and the third smallest gradient sum from among the eight gradient sums detected by the directionality strength determiner 120 form a Y-shaped structure around the target pixel (TP) without being consecutively adjacent in direction to each other, the second edge pattern determiner 133 may determine that the second edge pattern is included in the target kernel.

For example, FIGS. 6(*i*) to 6(*p*) illustrate example cases in which the positions of the gradient sums form a Y-shaped structure around the target pixel (TP) without being consecutively adjacent to each other in up, down, left and right directions with respect to the target pixel (TP). That is, as can be seen from FIG. 6(*i*), the pixels (1), (3), and (8) are respectively arranged in the left-lower direction, the right-lower direction, and the upper direction from the target pixel (TP), resulting in formation of the Y-shaped structure in the target kernel. As can be seen from FIG. 6(*j*), the pixels (2), (6), and (7) are respectively arranged in the lower direction, the right direction, and the left-upper direction from the target pixel (TP), resulting in formation of the Y-shaped structure in the target kernel. As can be seen from FIG. 6(*k*), the pixels (3), (4), and (9) are respectively arranged in the right-lower direction, the left direction, and the right-upper direction from the target pixel (TP), resulting in formation of the Y-shaped structure in the target kernel. As can be seen from FIG. 6(*l*), the pixels (1), (6), and (8) are respectively arranged in the left-lower direction, the right direction, and the upper direction from the target pixel (TP), resulting in formation of the Y-shaped structure in the target kernel. As can be seen from FIG. 6(m), the pixels (2), (7), and (9) are respectively arranged in the lower direction, the left-upper direction, and the right-upper direction from the target pixel (TP), resulting in formation of the Y-shaped structure in the target kernel. As can be seen from FIG. 6(n), the pixels (3), (4), and (8) are respectively arranged in the right-lower direction, the left direction, and the upper direction from the target pixel (TP), resulting in formation of the Y-shaped structure in the target kernel. As can be seen from FIG. 6(o), the pixels (1), (6), and (7) are respectively arranged in the left-lower direction, the right direction, and the left-upper direction from the target pixel (TP), resulting in formation of the Y-shaped structure in the target kernel. As can be seen from FIG. 6(p), the pixels (2), (4), and (9) are respectively arranged in the lower direction, the left direction, and the right-upper direction from the target pixel (TP), resulting in formation of the Y-shaped structure.

In some other implementations, the first edge pattern determiner 132 and the second edge pattern determiner 133 may determine that the first edge pattern or the second edge pattern is included in the target kernel when the sum of gradients (i.e., a gradient sum) for each direction does not have certain directionality. For example, as can be seen from FIG. 4, the sum of gradients in the horizontal direction from the pixel (4) to the pixel (6), the sum of gradients in the vertical direction from the pixel (2) to the pixel (8), the sum of gradients in the slash direction from the pixel (1) to the pixel (9), and the sum of gradients in the backslash direction from the pixel (3) to the pixel (7) may be determined. In this case, when there is no certain directionality in all of the gradient sums, the first edge pattern determiner 132 may determine that the first edge pattern is included in the target kernel and the second edge pattern determiner 133 may determine that the second edge pattern is included in the target kernel.

In some other implementations, when the first smallest gradient sum and the second smallest gradient sum from among the eight gradient sums detected by the directionality strength determiner 120 are asymmetrical in position to each other, the first edge pattern determiner 132 may determine that the first edge pattern is included in the target kernel and the second edge pattern determiner 133 may determine that the second edge pattern is included in the target kernel.

However, when the first smallest gradient sum and the position of the second smallest gradient sum are located at positions (4) and (6) shown in FIG. 4, this means that the corresponding kernel is definitely arranged in the horizontal direction, so that the first edge pattern determiner 132 may determine that the first edge pattern is not included in the target kernel and the second edge pattern determiner 133 may determine that the second edge pattern is not included in the target kernel.

Figure 7:
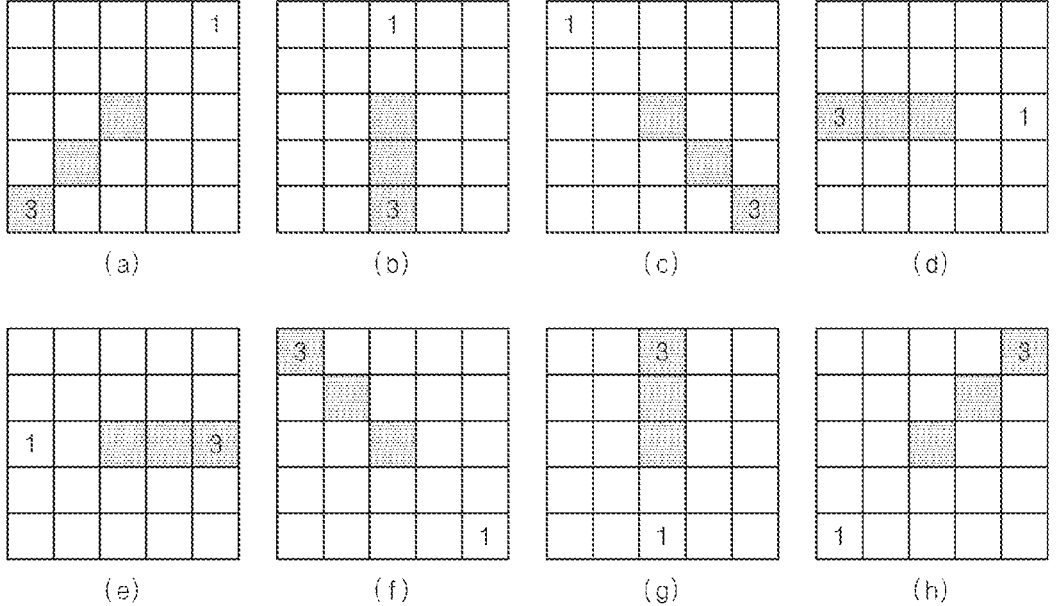
FIGS. 7 and 8 are schematic diagrams illustrating examples of a pixel interpolator shown in FIG. 1 based on some implementations of the disclosed technology.
Figure 8:
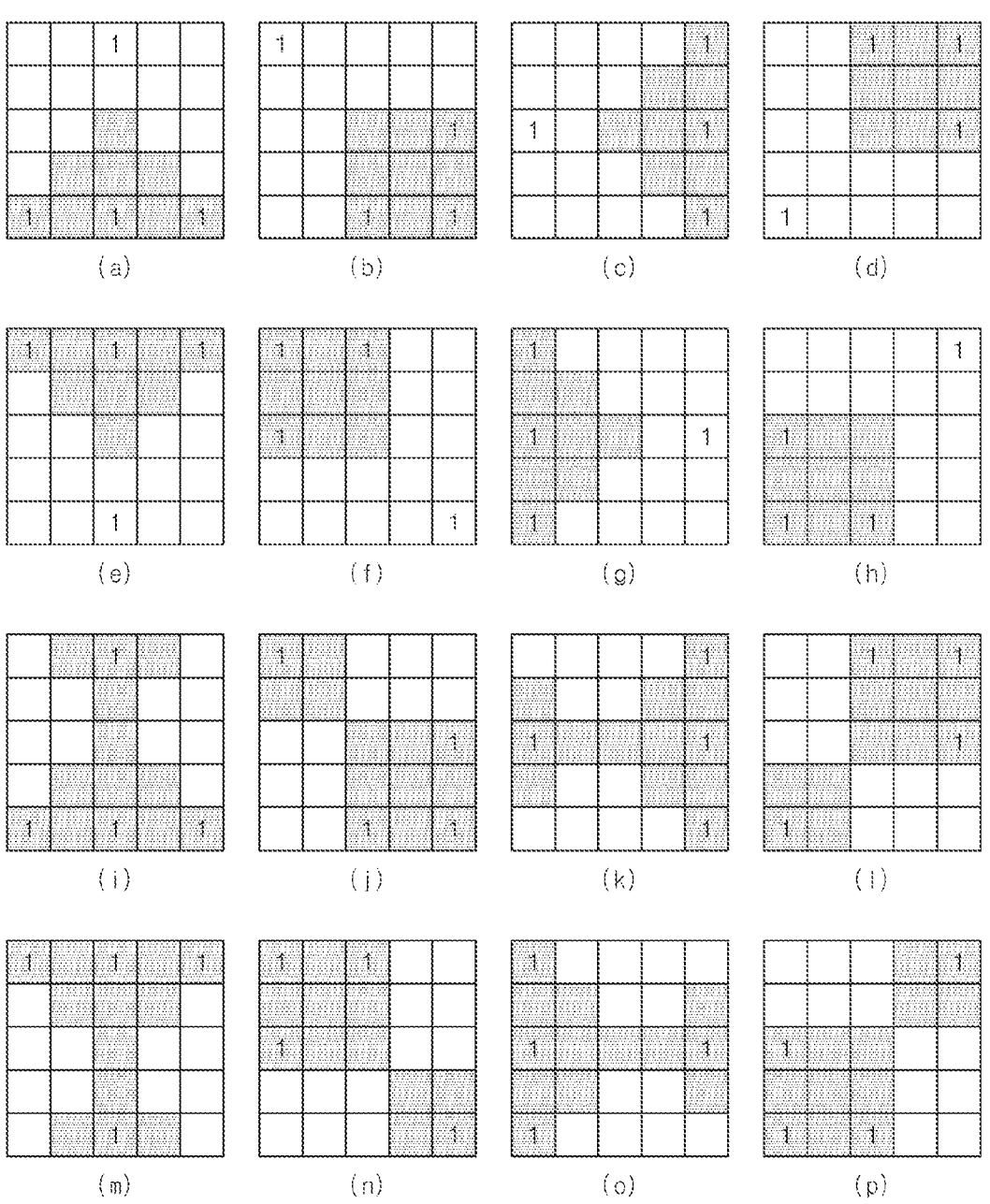

FIGS. 7 and 8 are schematic diagrams illustrating examples of the pixel interpolator 140 shown in FIG. 1 based on some implementations of the disclosed technology.

Referring to FIG. 7, the half-edge pattern interpolator 141 may interpolate a target pixel using pixel data of pixels determined by the half-edge pattern determiner 131. That is, the half-edge pattern interpolator 141 may consider values of homogeneous-color pixels in which the first smallest gradient sum from among the eight gradient sums detected by the sub-kernels is located, or may consider gradation of textures within kernels in which the first smallest gradient sum is located. Accordingly, the half-edge pattern interpolator 141 may compensate for the target pixel using an average value of a weight of a pixel having the first smallest gradient sum and a weight of the other pixel that is arranged to face the pixel while having the same color as the pixel.

For example, as can be seen from FIGS. 7(a) to 7(h), a weight of the pixel (i.e., pixel '3') in which the first smallest gradient sum is located and a weight of the homogeneous-color pixel (i.e., pixel '1') located opposite to the pixel '3' may be calculated, and an average value of the weights of the pixel '3' and the pixel '1' may be calculated to compensate for the target pixel.

Referring to FIG. 8, the first edge pattern interpolator 142 may interpolate the target pixel using pixel data of the pixels determined by the first edge pattern determiner 132, and the second edge pattern interpolator 143 may interpolate the target pixel using pixel data of the pixels determined by the second edge pattern determiner 133. In other words, the first edge pattern interpolator 142 and the second edge pattern interpolator 143 may compensate for the target pixel by using the average value of the homogeneous-color pixels present in the pattern or by using the weighted average value of a homogeneous-color pixel present in the pattern and a homogeneous-color pixel located opposite to the center of the pattern.

For example, as can be seen from FIGS. 8(a) to 8(h), when there is an edge pattern region only on one side of the target kernel, the weight of the homogeneous-color pixel (i.e., the pixel '1' located inside the edge pattern) present in the edge pattern and the weight of the homogeneous-color pixel (i.e., the pixel '1' located outside the edge pattern) located opposite to the center of the edge pattern may be calculated and averaged to compensate for the target pixel.

As another example, as can be seen from FIGS. 8(i) to 8(p), when there is an asymmetric edge pattern region on both sides of the target kernel, the weight of the homogeneous-color pixel (i.e., the pixel '1' located at one side of the asymmetric edge pattern) present in the asymmetric edge pattern and the weight of the homogeneous-color pixel (i.e., the pixel '1' located at the other side of the asymmetric edge pattern) located opposite to the center of the asymmetric edge pattern may be calculated and averaged to compensate for the target pixel.

Figure 9:
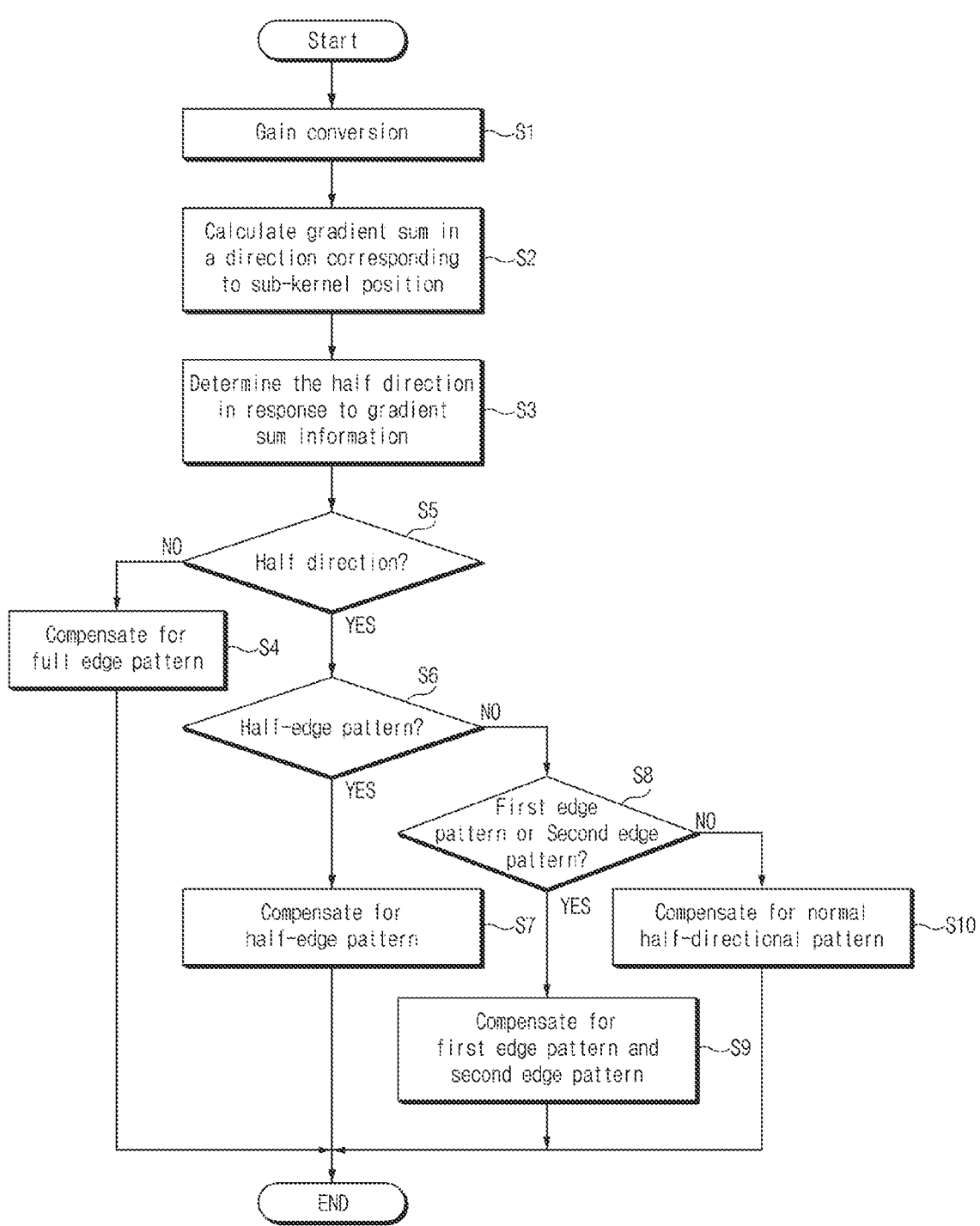
FIG. 9 is a flowchart illustrating an image signal processing method based on some implementations of the disclosed technology.

FIG. 9 is a flowchart illustrating an image signal processing method based on some implementations of the disclosed technology.

Referring to FIG. 9, the gain converter 110 may convert the gains of the pixels included in the Bayer pattern and may convert pixels included in the target kernel including the target pixel into homogeneous-color pixels having the same color (Step S1). Thereafter, the directionality strength determiner 120 may calculate the gradient sum in a direction corresponding to the position of each sub-kernel (Step S2).

Subsequently, the half-directional pattern determiner 130 may detect the half direction using the gradient sum information received from the directionality strength determiner 120 (Step S3). When the half-direction pattern determiner 130 does not detect the half direction, the half-direction pattern determiner 130 may compensate for the full edge pattern by determining the edge pattern to be the full edge pattern rather than the half-edge pattern (Step S4). For example, the image signal processor can correct the target pixel based on pixel data of adjacent pixels included in the full edge pattern.

The positions of the first smallest gradient sum and the second smallest gradient sum from among the eight gradient sums calculated in the sub-kernels may mean the half direction. Therefore, the first smallest gradient sum and the second smallest gradient sum are located at positions (1) and (6) shown in FIG. 4, the half-directional pattern determiner 130 may determine that a bent texture is present in the kernel corresponding to positions (1) and (6) of FIG. 4, so that the half-directional pattern determiner 130 may detect the half direction (Step S5).

Thereafter, when the half direction is detected in the texture, the half-edge pattern determiner 131 may determine the type of edge patterns in the texture having the half direction. First, it may be determined whether the half-edge pattern is included in the texture having the half direction (Step S6). If the half-edge pattern determiner 131 detects the presence of the half-edge pattern included in the target kernel, the half-edge pattern can be compensated for by the half-edge pattern interpolator 141 (Step S7).

On the other hand, when the half-edge pattern is not detected in the texture, the first edge pattern determiner 132 may determine whether the first edge pattern is included in the texture. Then, the second edge pattern determiner 133 may determine whether the second edge pattern is included in the texture (Step S8).

If the first edge pattern determiner 132 detects the presence of the first edge pattern, the first edge pattern may be compensated for by the first edge pattern interpolator 142. In addition, if the second edge pattern determiner 133 detects the presence of the second edge pattern, the second edge pattern may be compensated for by the second edge pattern interpolator 143 (step S9). When the first edge pattern determiner 132 does not detect the first edge pattern and the second edge pattern determiner 133 does not detect the second edge pattern, the normal half-directional pattern may be compensated for (Step S10). Here, the normal half-directional pattern may mean the half-directional pattern other than the half-edge pattern, the first edge pattern, and the second edge pattern from among the half-directional patterns. The pixel interpolator 140 may interpolate a normal half-directional pattern having half-length directionality using pixel data of pixels determined by the half-directional pattern determiner 130.

As is apparent from the above description, the image signal processor and the image signal processing method according to the embodiments of the disclosed technology can detect and correct a texture considering an edge corner at the position of a phase difference detection pixel during a binning mode of pixel(s), and can thus prevent correction errors of phase difference detection pixels that may be seen as a regular pattern in a high frequency region.

The embodiments of the disclosed technology may provide a variety of effects capable of being directly or indirectly recognized through the above-mentioned patent document.

Only a limited number of possible embodiments have been described, and it should be understood that modifications and enhancements to the disclosed embodiments and other embodiments can be devised based on what is described and/or illustrated in this patent document.

What is claimed is:

1. An image signal processor comprising:
   a directionality strength determiner configured to divide a target kernel including a target pixel into a plurality of sub-kernels, and generate gradient sum information by calculating directionality strength of each of the plurality of sub-kernels;
   a half-directional pattern determiner configured to determine whether a half- directional edge pattern is included in each of the sub-kernels in response to the gradient sum information; and a pixel interpolator configured to interpolate the target pixel in response to the edge pattern determined by the half-directional pattern determiner,
   wherein the half-directional pattern determiner includes:
   a half-edge pattern determiner configured to determine a half-edge pattern corresponding to a kernel including the target pixel in response to the gradient sum information;
   a first edge pattern determiner configured to detect a first edge pattern corresponding to a kernel including the target pixel in response to the gradient sum information; and
   a second edge pattern determiner configured to detect a second edge pattern corresponding to a kernel including the target pixel in response to the gradient sum information,
   wherein the half-edge pattern determiner is configured to:
   determine that the half-edge pattern is included in the target kernel, when a first smallest gradient sum from among the gradient sum information is smaller than remaining gradient sums other than the first smallest gradient sum by a predetermined threshold or greater.

2. The image signal processor according to claim 1, further comprising:
   a gain converter configured to convert pixels included in the target kernel into pixels having the same color by converting a gain of a color pixel.

3. The image signal processor according to claim 2, wherein:
   the gain converter includes at least one red pixel, at least one blue pixel, and at least one green pixel, wherein the gain converter is configured to generate the target kernel having the green pixel by applying a gain value to the red pixel and the blue pixel.

4. The image signal processor according to claim 1, wherein the directionality strength determiner is configured to:
   determine that, as a gradient sum value of the gradient sum information decreases, a target texture is more likely to be a texture arranged in a corresponding direction.

5. The image signal processor according to claim 1, wherein:
   the gradient sum is a value obtained by summing differences between pixel data values of pixel pairs arranged in a specific direction.

6. The image signal processor according to claim 1, wherein the directionality strength determiner is configured to:
   calculate the gradient sum in each of a vertical direction, a horizontal direction, a slash direction, and a backslash direction of the plurality of sub-kernels arranged around the target pixel.

7. The image signal processor according to claim 1, wherein the first edge pattern determiner is configured to:
   determine that the first edge pattern is included in the target kernel, when a first smallest gradient sum, a second smallest gradient sum, and a third smallest gradient sum from among the gradient sum information are consecutively adjacent in position to each other.

8. The image signal processor according to claim 1, wherein the second edge pattern determiner is configured to:
   determine that the second edge pattern is included in the target kernel, when a first smallest gradient sum, a second smallest gradient sum, and a third smallest gradient sum from among the gradient sum information form a Y-shaped structure around the target pixel without being consecutively adjacent in direction to each other.

9. The image signal processor according to claim 1, wherein:

the half-edge pattern is a pattern in which a region of one side of an edge crossing the target kernel is filled with a texture region and a non-texture region.

10. The image signal processor according to claim 1, wherein:

the second edge pattern is configured such that texture regions facing each other in a diagonal direction with respect to edges perpendicular to each other within the target kernel have the same pattern.

11. The image signal processor according to claim 10, wherein:

the second edge pattern is configured such that the texture regions facing each other in the diagonal direction have different sizes from each other.

12. The image signal processor according to claim 1, wherein:

the first edge pattern is configured such that texture patterns disposed in the target kernel have two diagonal directions with respect to an edge serving as a boundary.

13. The image signal processor according to claim 1, wherein the pixel interpolator includes:

a half-edge pattern interpolator configured to interpolate the target pixel using pixel data of pixels determined by the half-edge pattern determiner;

a first edge pattern interpolator configured to interpolate the target pixel using pixel data of pixels determined by the first edge pattern determiner; and a second edge pattern interpolator configured to interpolate the target pixel using pixel data of pixels determined by the second edge pattern determiner.

14. The image signal processor according to claim 13, wherein the half-edge pattern interpolator is configured to:

interpolate the target pixel by calculating an average value of a weight of a pixel having a first smallest gradient sum from among the gradient sum information and a weight of a homogeneous-color pixel located opposite to the pixel having the first smallest gradient sum.

15. The image signal processor according to claim 13, wherein the first edge pattern interpolator is configured to:

when the first edge pattern is present at one side of the target kernel, calculate a weight of a homogeneous-color pixel present in the first edge pattern and a weight of a homogeneous-color pixel located opposite to a center of the first edge pattern, average the calculated weights, and interpolate the target pixel.

16. The image signal processor according to claim 13, wherein the second edge pattern interpolator is configured to:

when the second edge pattern is present at both sides of the target kernel, calculate a weight of a homogeneous-color pixel present in the second edge pattern and a weight of a homogeneous-color pixel located opposite to a center of the second edge pattern, average the calculated weights, and interpolate the target pixel.

17. A method for processing an image signal comprising:

converting pixels included in a target kernel having a target pixel into pixels having the same color by converting a gain of a color pixel;

dividing the target kernel into a plurality of sub-kernels;

calculating a gradient sum in a direction corresponding to positions of the plurality of sub-kernels;

determining a half direction using the gradient sum;

compensating for a full edge pattern when a result of determination of the half direction is not the half direction, and determining a type of an edge pattern when a result of determination of the half direction is the half direction; and compensating for an edge pattern in response to the type of the edge pattern.

18. The method according to claim 17, wherein:

the type of the edge pattern is a pattern in which a region of one side of an edge crossing the target kernel is filled with a texture region and a non-texture region.

* * * * *